United States Patent [19]

Nakamura

[11] 3,806,807

[45] Apr. 23, 1974

[54] DIGITAL COMMUNICATION SYSTEM WITH REDUCED INTERSYMBOL INTERFERENCE

[75] Inventor: Hiroshi Nakamura, Kanagawa-ken, Japan

[73] Assignee: Fujitsu Limited, Kawasaki, Japan

[22] Filed: Dec. 3, 1971

[21] Appl. No.: 204,508

[52] U.S. Cl. .......................... 325/42, 178/68, 325/65

[51] Int. Cl. .......................................... H04b 1/62

[58] Field of Search ......... 178/68 X; 325/42, 62, 65

[56] References Cited

UNITED STATES PATENTS

| | | | |
|---|---|---|---|
| 3,274,582 | 9/1966 | Gibson | 325/42 UX |
| 2,522,738 | 9/1950 | Bayard et al. | 178/68 |
| 3,523,291 | 8/1970 | Pierret | 178/68 UX |
| 3,611,143 | 10/1971 | Van Gerwen | 325/42 |
| 3,619,502 | 11/1971 | Croisier | 325/42 X |

*Primary Examiner*—Felix D. Gruber
*Assistant Examiner*—R. Stephen Dildine, Jr.
*Attorney, Agent, or Firm*—Herbert L. Lerner

[57] ABSTRACT

The transmitter of a digital communication system comprises a compensator which controls at least one of the level, frequency and phase of a signal to be transmitted in accordance with a characteristic of the communication system and the condition of the code preceding or succeeding the signal. The level, frequency and phase at the detector of the receiver are designated values.

3 Claims, 13 Drawing Figures

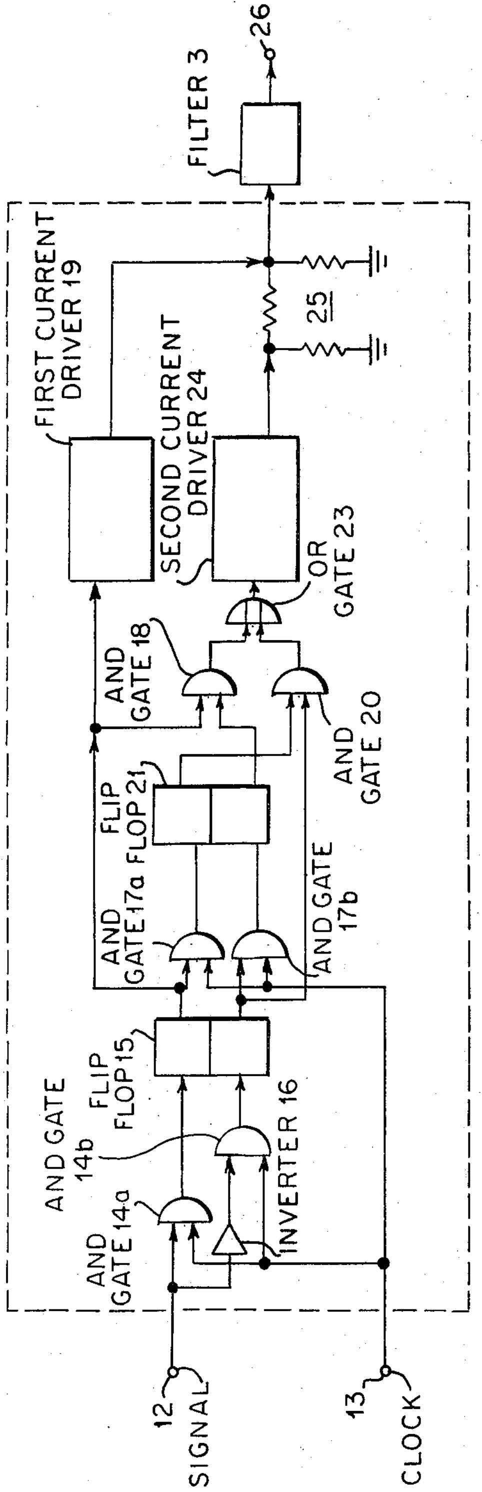
FIG. 6a
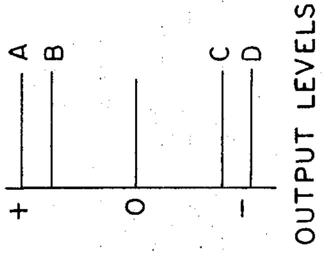
FIG. 6b
| FF 1 | FF 2 | DR 1 | DR 2 | OUTPUT |
|---|---|---|---|---|
| 1 | 1 | 1 | 0 | B |
| 1 | 0 | 1 | 1 | A |
| 0 | 1 | 0 | 0 | D |
| 0 | 0 | 0 | 1 | C |
FIG. 6c

CURRENT DRIVER

4 PHASE PSK SYSTEM

DIGITAL COMMUNICATION SYSTEM WITH REDUCED INTERSYMBOL INTERFERENCE

SPECIFICATION

The invention relates to a digital communication system for transmitting digital signals. More particularly, the invention relates to a digital communication system with reduced intersymbol interference.

The transmission of digital signals via a transmission system of a finite bandwidth is always accompanied by intersymbol interference. The intersymbol interference and thermal noises are considerable factors which determine the quantity of transmission. It is well known, for example, that in a transmission system in which signals are transmitted without modification of the base band and in a phase shift keyed, or PSK, communication system wherein signals are transmitted after modification of the phase of the carrier wave by the digital signal, no intersymbol interference is produced when a square cosine type filter of Gauss type filter is utilized. When the channels are arranged in accordance with the principle of frequency division, andd so on, however, adjacent channels are very close to each other and therefore the condition of radiation outside the band, and so on, is restricted and in many cases the Gauss type filter cannot be utilized. The intersymbol interference may be reduced by the use of filters which reduce the radiation outside the band and reduce disturbance due to adjacent channels. Such filters permit as little interference as possible in the transmitter and receiver.

The principal object of the invention is to provide a digital communication system with reduced intersymbol interference.

An object of the invention is to provide a digital communication system with reduced intersymbol interference caused by the finite bandwidth of the system.

Another object of the invention is to provide a digital communication system with simple structure which reduces intersymbol interference with efficiency, effectiveness and reliability.

In accordance with the present invention, a digital communication system having a transmitter and a receiver comprises a compensator in the transmitter for controlling at least one of the level, frequency and phase of a signal to be transmitted. Detecting means in the transmitter detects the condition of the code next-adjacent the signal and controls the compensator to an extent determined by the condition of the next-adjacent code.

The transmitter further comprises means for controlling the compensator in accordance with a characteristic of the communication system.

The detecting means in the transmitter may detect the condition of the code next-preceding the signal and control the compensator to an extent determined by the condition of the next-preceding code, or it may detect the condition of the code next-succeeding the signal and control the compensator to an extent determined by the condition of the next-succeeding code, or it may detect the condition of the code next-preceding and the code next-succeeding the signal and control the compensator to an extent determined by the condition of the next-preceding and next-succeeding codes.

In order that the invention may be readily carried into effect, it will now be described with reference to the accompanying drawings, wherein.

Figure 5:
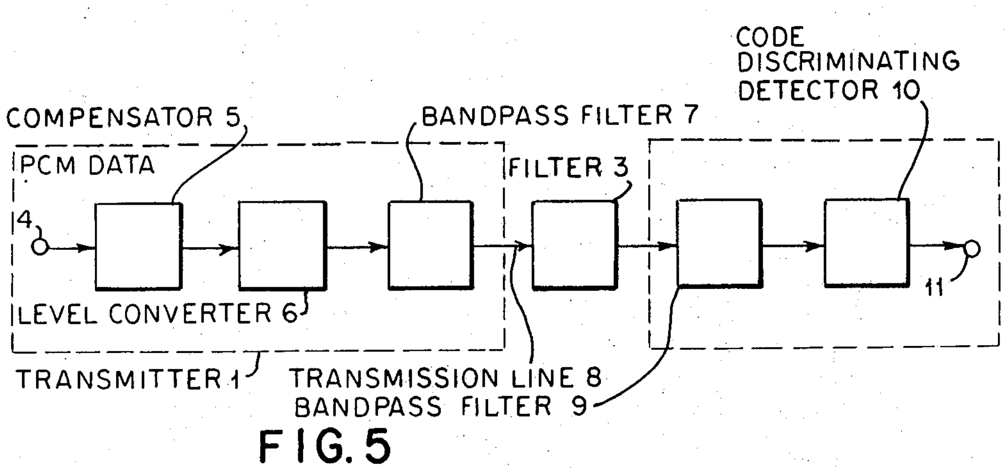
FIG. 5 is a block diagram of an embodiment of the base band transmission digital communication system of the invention.

FIG. 6*a* is a circuit and block diagram of an embodiment of the transmitter of the base band transmission digital communication system of FIG. 5;

FIG. 6*b* is a graphical presentation of the output levels in the transmitter of the base band transmission system of FIG. 6*a;*

FIG. 6*c* is a table indicating the signal conditions of the flip flops and the current drivers of the transmitter of FIG. 6*a;*

Figure 7:
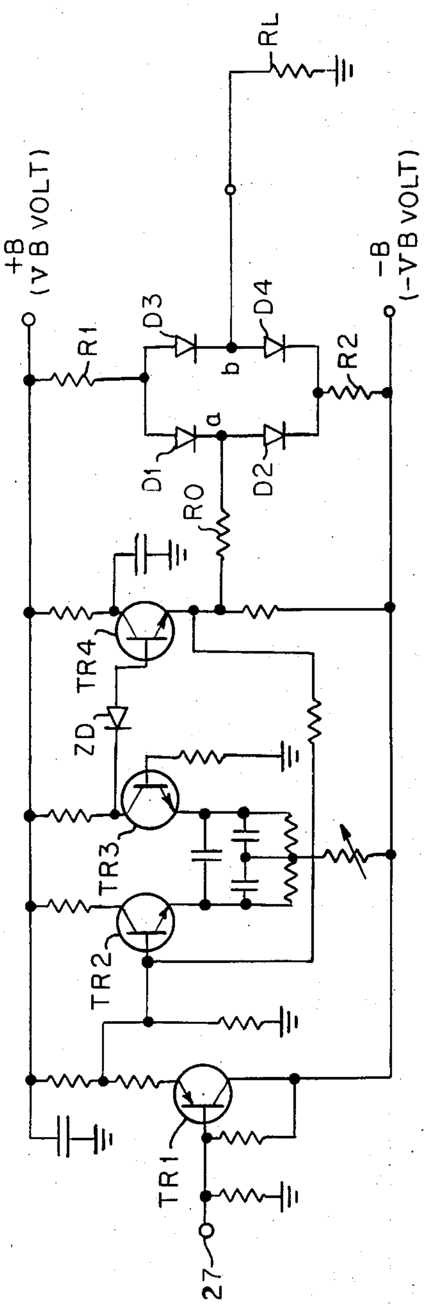

FIG. 7 is a circuit diagram of each of the current drivers of the transmitter of the base band transmission system of FIG. 6*a;*

Figure 9:
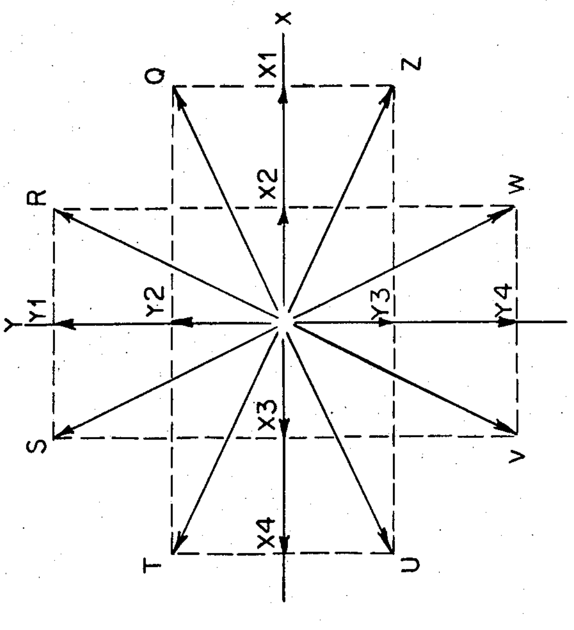
Figure 8:
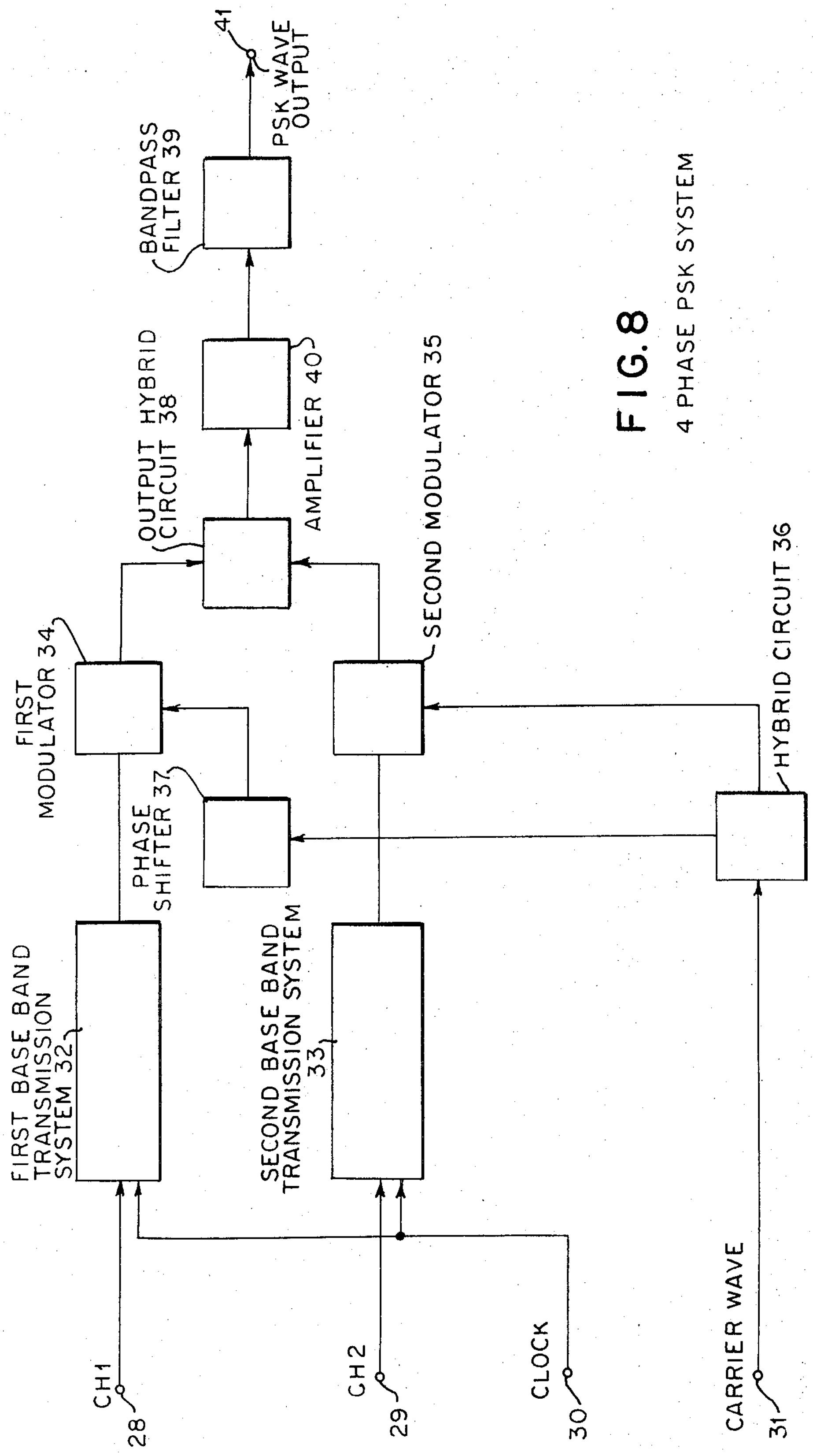
Figure 10A:
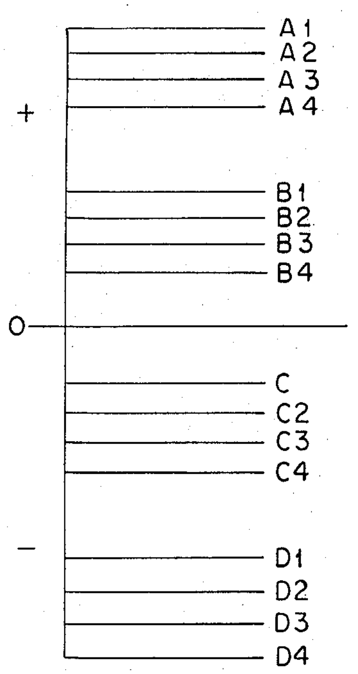
Figure 10B:
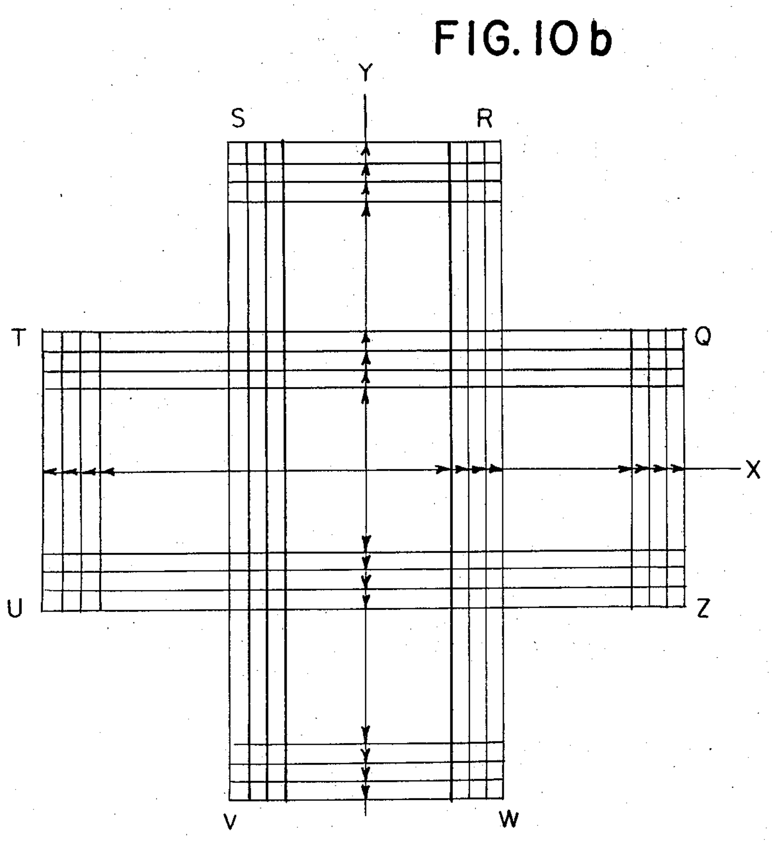

FIG. 8 is a block diagram of an embodiment of a PSK system utilizing the base band transmission digital communication system of the invention;

FIG. 9 is a vector diagram explaining the operation of the PSK system of FIG. 8; and FIGS. 10*a* and 10*b* illustrate the modulation levels.

Figures 1, 2, 3, 4:
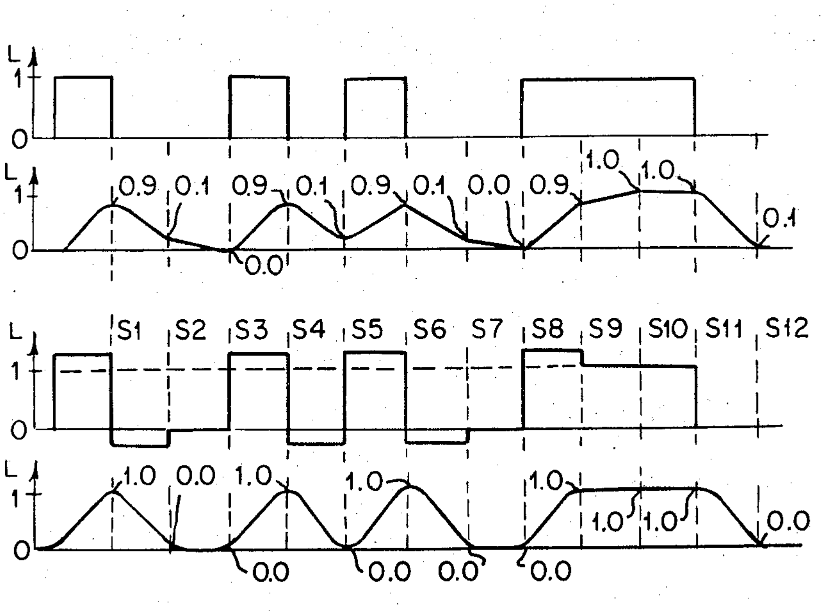
FIG. 1 PRIOR ART, FIG. 2 PRIOR ART, FIG. 3, FIG. 4
FIG. 1 is a graphical presentation of signals transmitted in a conventional digital communication system.
FIG. 2 is a graphical presentation of signal waveforms received at the detector of the receiver of a conventional digital communication system.
FIG. 3 is a graphical presentation of signals transmitted in the digital communication system of the invention.
FIG. 4 is a graphical presentation of signal waveforms received at the detector of the receiver of the digital communication system of the invention.

In FIGS. 1, 2, 3 and 4, the abscissa represents the time t and the ordinate represents the signal level L. It is assumed that the conventional signals shown in FIG. 1 are transmitted through the transmission line from the transmitter to the receiver of a conventional digital communication system comprising a transmitter and a receiver. The signals received at the detector or discriminator of the receiver are those shown in FIG. 2. Sampling points S1 to S12 are provided. There is no intersymbol interference if the signal level is 1 at $t = 0$ and 0 at $t = nT$, wherein $n$ is not zero and varies between minus and plus infinity.

It is assumed that in the conventional transmission system, filters are utilized and the signal level is 0.9 at $t = 0$ and 0.1 at $t = T$ and at other levels of $n$. The signal level 1 may thus be discriminated at the sampling points S1, S4, S6, S9, S10 and S11, and the signal level 0 may be discriminated at the other sampling points, as shown in FIG. 2. It must be noted, however, that the signal level is 1 at the sampling points S10 and S11, but is 0.9 at the sampling points S1, S4, S6 and S9. Therefore, when there are noises present, the error rates of S1, S4 S6 and S9 are inferior to the error rates of S10 and S11. This causes the intersymbol interference.

In other words, the levels of the received pulses in some cases are not 0 or 1 at the sampling points, because of the influence of the band limiting operation of the filters in the transmission system. This results in the intersymbol interference. This means that there will be no intersymbol interference if the input signal levels of the discriminator are 0 or 1 at the sampling points. The present invention is based upon eliminating the intersymbol interference by providing 0 or 1 input signal levels at the sampling points.

In accordance with the invention, the intersymbol interference is reduced by providing 0 or 1 input signal levels of the discriminator at the sampling points. The digital communication system of the invention is illustrated in FIGS. 3 to 9. FIGS. 3 to 7 illustrate one embodiment of the digital communication system of the invention and FIGS. 8 and 9 illustrate another embodiment of the digital communication system of the invention.

FIG. 3 illustrates signals transmitted through a base band transmission digital communication system of the invention and FIG. 4 illustrates the input waveforms received at the detector of the receiver which receives the transmitted signals illustrated in FIG. 3. FIG. 5 illustrates an embodiment of the base band transmission digital communication system of the invention.

In FIG. 5, signals are transmitted from a transmitter 1 to a receiver 2 via a filter 3. In the transmitter 1, digital pulse code modulation, or PCM, data supplied at an input terminal 4 is passed through a compensator 5 to a level converter 6. The compensator 5 and level converter 6 comprise logical circuits. Tle level converter 6 converts the levels of the signals to suitable levels. The output of the level converter 6 is supplied to a bandpass filter 7. The bandpass filter 7 of the transmitter limits the band and produces an output which is transmitted via a transmission line 8.

The output signals of the transmitter 1 are transmitted to the receiver 2 via the transmission line and the filter 3 therein. The receiver 2 comprises a bandpass filter 9 which receives the signals from the transmission line 8. The output signals of the bandpass filter 9 are discriminated and detected by a code discriminating detector 10. The output signals of the code discriminating detector 10 are provided at an output terminal 11 as digital signals.

In accordance with the invention, in transmitting the signals shown in FIG. 1, the transmission level is controlled by the compensator 5 of the transmitter 1. The level converter 6 of the transmitter 1, or other level controlling component of said transmitter, is controlled by the compensator 5 in a manner whereby signals may be transmitted with an output level of 1/0.9 instead of 1, as shown in FIG. 3, at the sampling point S1, for example, of the receiver.

By such pretransmission control of the transmission level in he transmitter 1, as hereinbefore described, the input level of the detector 10 of the receiver 2 may be made 1, as shown in FIG. 4. The trnasmission level variation at the sampling point S1 may thus be compensated and the error rate of coding does not deteriorate. Similarly, −1/0.8 instead of 0, as shown in FIG. 3, is transmitted at the instant of the next sampling point S2, and the transmission level at the detector is made 0, as shown in FIG. 4.

In the aforedescribed manner, the transmission output level of a signal is compensated prior to transmission in accordance with the level of the preceding signal, as shown in FIG. 3. The compensated signal is then transmitted and the operation is repeated. In this system, it is assured that the input waveforms at the receiver at the sampling points S1 to S12 are made 0, as shown in FIG. 4, so that there is no resultant intersymbol interference and the error rate does not deteriorate.

FIGS. 6*a*, 6*b* and 6*c* illustrate the structure of the transmitter of the base band transmission digital communication system of FIG. 5. FIG. 7 shows the circuitry of the current drivers of the transmitter of FIG. 6*a*. In FIG. 6*a*, signal information is supplied to an input terminal 12 and clock signals are supplied to an input terminal 13. A first input of an AND gate 14*a* is connected to an input terminal 12 and a second input of the AND gate 14*a* is connected to an input terminal 13 so as to synchronize the signal information and clock signal. A first input of an AND gate 14b is connected to the input terminal 12 via an inverter 16 and a second input of the AND gate 14*b* is connected to the input terminal 13. The output of the AND gate 14*a* is connected to the set input of a flip flop 15. The output of the AND gate 14*b* is connected to the reset input of the flip flop 15.

Accordingly, the flip flop 15 is set by the output of the AND gate 14*a* and reset by the output of the AND gate 14*b*. A first input of an AND gate 17*a* is connected to the set output of the flip flop 15 and a second input of the AND gate 17*a* is connected to the input terminal 13. A first input of an AND gate 17*b* is connected to the reset output of the flip flop 15 and a second input of the AND gate 17*b* is connected to the input terminal 13.

The set output of the flip flop 15 is connected to a first input of an AND gate 18 and further to an input of a first current driver 19. The reset output of the flip flop 15 is connected to a first input of an AND gate 20. The output of the AND gate 17*a* is connected to the set input of a flip flop 21. The output of the AND gate 17*b* is connected to the reset input of the flip flip 21. The set output of the flip flop 21 is connected to the second input of the AND gate 20. The reset output of the flip flop 21 is connected to the second input of the AND gate 18. The output of the AND gate 18 is connected to the first input of an OR gate 23 and the output of the AND gate 20 is connected to the second input of said OR gate. The output of the OR gate 23 is connected to the input of a second current driver 24.

The outputs of the first and second current drivers 19 and 24 are combined in a resistor network 25 and are supplied to the input of the filter 3(FIG.5). The output of the filter 3 is provided at an output terminal 26. Although the signal output of the AND gate 14 is stored in the flip flop 15, the signal next-preceding said signal is supplied through the AND gate 17 to the flip flop 21 and is stored therein.

In the transmitter of FIG. 6*a*, the output transmission level is controlled by the signal informations of two bits stored in the two flip flops 15 and 21. The informations stored in the flips flops 15 and 21 are combined in the AND gates 18 and 20 and the OR gate 23 and are supplied to the first and second current drivers 19 and 24. The code information detecting part of the transmitter comprises the flip flops 15 and 21, the AND gates 18 and 20 and the OR gate 23.

FIG. 6*c* shows the values of the first and second current drivers 19 and 24 and the magnitude of the output levels corresponding to the conditions of the signal bits stored in the flip flop 15 and the next-preceding signal bit stored in the flip flop 21. The output transmission levels are illustrated in FIG. 6*b*. As shown in FIGS. 6*b* and 6*c*, there are two 1 output levels A and B and two 0 output levels C and D.

One level of the four levels of FIG. 6*b* is selected in accordance with the condition of the next-preceding bit. That is, when a bit and the next-preceding bit are both 1 such as, for example, when there is no change in the code, the B level of FIG. 6*b* is utilized, whereas when there is a change of code the A level of FIG. 6*b* is utilized. Thus, control is effected so that the level of the output signal of the filter 3 at the output terminal 26 (FIG. 6*a*) at the sampling point always has a constant value.

FIG. 7 illustrates a current driver circuit which may be utilized as the first current driver 19 and as the second current driver 24 (FIG. 6*a*). The current driver of FIG. 7 is a known digital to analog converter. A transistor TR1 is an impedance converting amplifier of common collector type. A differential amplifier comprising transistors TR2 and TR3 is connected to the output of the impedance converting amplifier. The differential amplifier is a well known circuit and functions in a known manner to amplify the output level of the transistor TR1 to the required level. A transistor TR4 functions as an amplifier of common collector type and is connected to the output of the differential amplifier as an output amplifier. The amplifier comprising the transistor TR4 shifts the level by utilizing a Zener diode ZD to provide an output level with 0 volts as the center.

It is assumed, for the purpose of illustration, that the level 1 of the logic circuit in the next-preceding stage connected to the input terminal 12 of FIG. 6*a* is supplied at an input terminal 27 of FIG. 7 and that the emitter electrode of the transistor TR4 exceeds +2.5 volts. This results in a flow of current from the transistor TR4 through a resistor RO, a diode D2, a resistor R2 and the negative terminal $-B$ of the voltage source. Since the three resistors R0, R1 and R2 are related to each other in the sense that R0 is very much smaller in resistance value than R1 or R2, a point *a* in the circuit of FIG. 7 exceeds +2.0 volts and a diode D1 is cut off or switched to its non-conductive condition. Current flows to a load RL from the positive terminal +B of the voltage source, the resistor R1, a diode D3 and said load. A positive output may thus be provided. At this instant, a diode D4 is cut off or switched to its non-conductive condition.

If a diode produces a voltage drop $Vd$, the output voltage $eo+$ of the load resistance $RL$ may be expressed as $$eo+ = (VB - Vd)\ RL/Rl + RL$$

If the 0 level of the logic circuit in the next-preceding stage is supplied to the current driver of FIG. 7 via the input terminal 27, the emitter electrode of the transistor TR4 becomes lower in voltage than −2.5 volts, current flows from the positive terminal $+B$ through the resistor R1, the diode D1 and the resistor R0. The circuit point *a* in FIG. 7 thus becomes negative and the diode D2 is cut off or switched to its non-conductive condition. Current flows from the load resistance RL through the diode D4 and the resistor R2 to the negative terminal $-B$ of the voltage source. In this case, the output voltage $eo-$ of the load resistance $RL$ may be expressed as $$eo- = (-VB + Vd)\ RL/R2 + RL$$

Although in the additional communication system of the present invention a specific bit is corrected in view of the bit next-preceding said specific bit, it is sometimes more advantageous to correct said specific bit in view of the next-succeeding bit, in dependence upon the type of filter. Obviously, a better result would be provided by correcting the specific bit in view of the next-preceding and next-succeeding bits. As the band of the filter becomes narrow, a better result is provided by considering as many bits as possible next-preceding and next-succeeding the specific bit.

The concept of pre-compensation in a digital communication system in accordance with the present invention is applicable not only to the aforedescribed base band transmission system, but is also applicable to other communication systems such as, for example, PSK systems and frequency shift keyed, or FSK, systems wherein the frequency of the carrier wave is modulated by digital signals and the signals are then transmitted. The concept of precompensation of the present invention is also applicable to modulation systems such as, for example, amplitude modulation systems.

FIG. 8 shows the circuit of a 4-phase phase shift keyed system which includes the invention. Signal information CH1 of the first channel is supplied via an input terminal 28. Signal information CH2 of the second channel is supplied via an input terminal 29. Clock information is supplied via an input terminal 30. Carrier wave information is supplied via an input terminal 31. The input terminal 28 is connected to an input of a first base band transmission system 32 which is the same as the base band transmission system of FIG. 6*a*. The input terminal 30 is connected to another input of the first base band transmission system 32. The input terminal 29 is connected to an input of a second base band transmission system 33 which is the same as the base band transmission system of FIG. 6*a*. The input terminal 30 is connected to another input of the second base band transmission system 33.

The output of the first base band transmission system 32 is connected to a first input of a first modulator 34. The output of the second base band transmission system 33 is connected to a first input of a second modulator 35. The input terminal 31 is connected to the input of a hybrid circuit 36. A first output of the hybrid circuit 36 is connected to a second input of the first modulator 34 via a phase shifter 37. The phase shifter 37 provides a phase shift of $\pi/2$ radians. A second output of the hybrid circuit 36 is connected to a second input of the second modulator 35.

The output of the first modulator 34 is connected to a first input of an output hybrid circuit 38. The output of the second modulator 35 is connected to a second input of the output hybrid circuit 38. The output of the output hybrid circuit 38 is connected to the input of a bandpass filter 39 via an amplifier 40. An output terminal 41 is connected to the output of the bandpass filter 39.

The signal information CH1 and the clock information are supplied from the input terminals 28 and 30 to the first base band transmission system 32. The signal information CH2 and the clock information are supplied from the input terminals 29 and 30 to the second base band transmission system 33. Each of the first and second modulators 34 and 35 comprises a known ring modulator. The outputs of the first and second base band transmission systems 32 and 33 are supplied to the first and second modulators 34 and 35, respectively. The carrier wave is supplied from the input terminal 31 to the first modulator 34 via the hybrid circuit 36 and the phase shifter 37 and is supplied to the second modulator 35 via said hybrid circuit. The hybrid circuit 36 is a well known hybrid circuit and the phase shifter 37 is a well known phase shifter. The carrier wave supplied to the first modulator 34 is thus different in phase by $\pi/2$ radians from the carrier wave supplied to the second modulator 35.

Phase shift keyed or PSK modulation of 0 radians is provided on the carrier wave in the first modulator 34 in correspondence with the condition of the signal information CH1. PSK modulation of $\pi$ radians is provided on the carrier wave in the second modulator 35 in correspondence with the condition of the signal information CH2. The output hybrid circuit 38 combines the output of the first and second modulators 34 and 35 and the amplifier 40 amplifies the combined outputs. The bandpass filter 39 limits the band and its output is provided at the output terminal 41 as a PSK wave output.

PSK modulation is thus applicable not only to 4-phase systems, but to *n*-phase systems, wherein *n* is an integer. Thus, for example, PSK modulation may be applied to an 8-phase system as follows. In an 8-phase PSK modulator of a digital communication system, an input PCM signal is made to correspond to one of eight vectors *Q*, *R*, *S*, *T*, *U*, *V*, *W* and *Z*, shown by solid line in the vector diagram of FIG. 9. Informations of three bits are transmitted at a time. The 8-phase modulator may have different structures, but a well known structure includes a modulator provided by the composition of amplitude modulated waves orthogonal to each other, as shown in FIG. 9.

In the method of orthogonal amplitude modulated waves, as evident from FIG. 9, one of levels X1 to X4 on the *X* axis or abscissa and one of levels Y1 to Y4 on the *Y* axis or ordinate orthogonal to the *X* axis are utilized. Thus, for example, the vector of the output Q may be provided by the composition of X1 and Y2 and the vector of the output *V* may be provided by the composition of X3 and Y4. The levels X1, X2, X3 and X4 and Y1, Y2, Y3 and Y4 on the *X* and *Y* axes are made to correspond to the four levels A, B, C and D shown in FIG. 6*b*. Thus, 16 levels may be provided in all. For this purpose, the logical circuitry of FIG. 7 must be provided so that it may correspond to these 16 levels.

Although the above explanation has been made by means of a conventional 8 phase modulator, an explanation in applying this invention will be made as follows. Namely, while the conventional modulator has had four levels, the number of levels available in an AM modulator of *X* or *Y* corresponding to FIG. 6*b* is 16 levels, for example, as shown in FIG. 10*a*. Namely, the fundamental four levels are divided into four levels respectively in accordance with the position of the condition of the preceding code or the succeeding code in said fundamental four levels. Thus, in each of *X* and *Y* channels, a fundamental level can obtain four levels, and so each of the vectors *Q* ~ *Z* shown in FIG. 9 can obtain 16 levels as will be evident from FIG. 10*b*.

Although only a base band transmission system and a PSK system have been shown in the drawings, the principle of the invention is also applicable to FSK modulation systems. In such case, the levels and the frequency are controlled by the compensator.

As hereinbefore described, in accordance with the invention, the influence of intersymbol interference is eliminated due to band limitation in the transmitter of the digital communication system.

While the invention has been described by means of specific examples and in specific embodiments, it should not be limited thereto, for obvious modifications will occur to those skilled in the art without departing from the spirit and scope of the invention.

I claim:

1. A digital communication system utilizing PSK modulation waves for transmitting and receiving *n*-phase PSK modulation waves produced by combining amplitude modulation waves crossing each other at right angles, said digital communication system comprising a transmission system having two base band systems receiving the input signals of each of two channels, the base band systems comprising a compensator for controlling the level of the input signal and detecting means having an output connected to the compensator for detecting the condition of the codes adjacent to the input signal and for controlling the magnitude of control of the compensator in accordance with the output of the detecting means and the characteristic of the digital communication system; and modulating means for producing n-phase PSK modulation waves by amplitude modulation and combination of the output of each of the base band systems.

2. A digital communication system as claimed in claim 1, wherein the detecting means in the transmitter detects the condition of the code next-preceding said signal and controls the compensator to an extent determined by the condition of the next-preceding code.

3. A digital communication system as claimed in claim 1, wherein the detecting means in the transmitter detects the condition of the code next-succeeding said signal and controls the compensator to an extent determined by the condition of the next-succeeding code.

* * * * *